J. HORANSZKY.
PROPELLING MEANS FOR CHILDREN'S VEHICLES.
APPLICATION FILED DEC. 11, 1912.
1,069,258.
Patented Aug. 5, 1913.
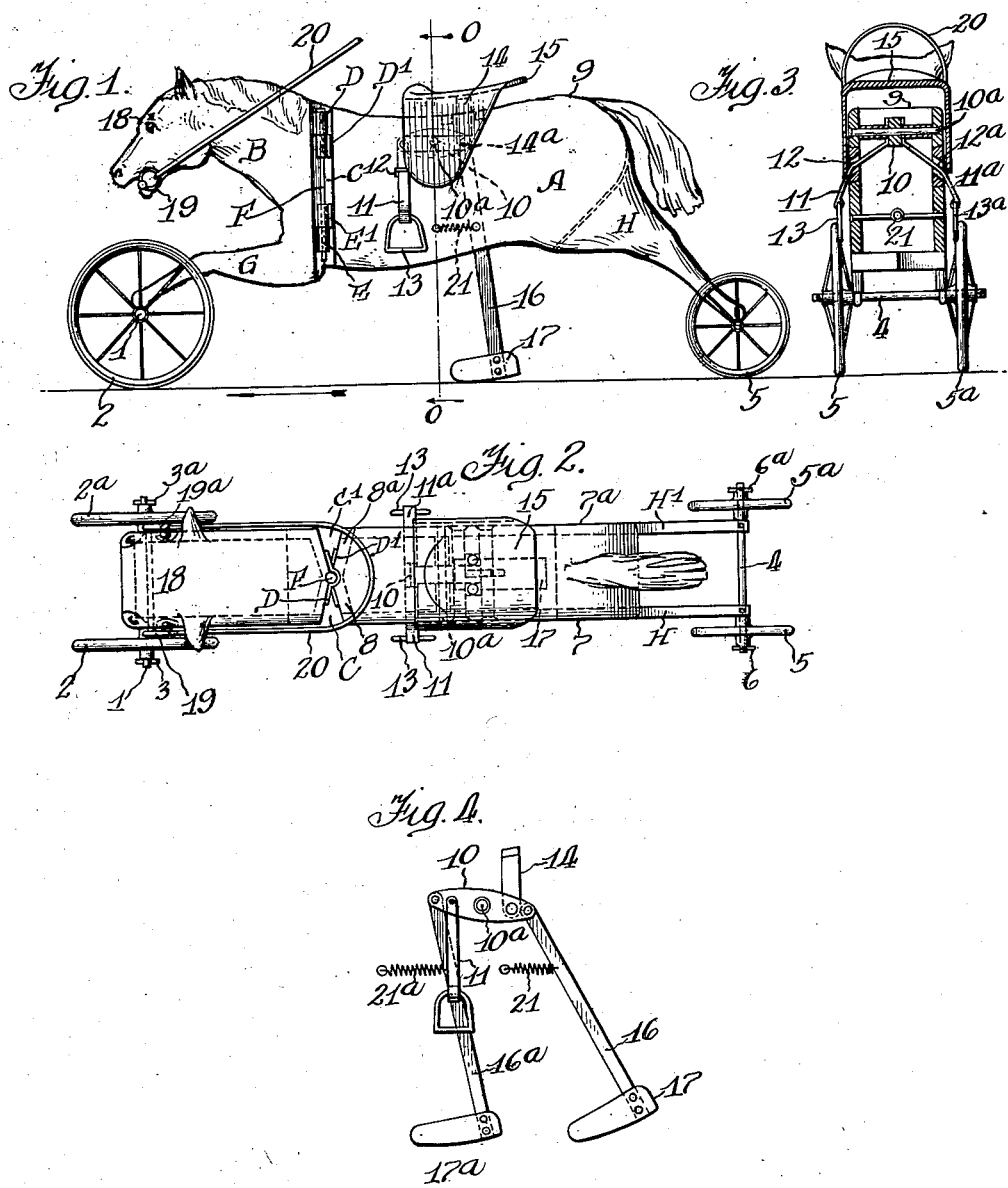
Witnesses:
Inventor:
John Horanszky
By Michael J. Stern & Sons
Attorneys

UNITED STATES PATENT OFFICE.

JOHN HORANSZKY, OF CHICAGO, ILLINOIS.

PROPELLING MEANS FOR CHILDREN'S VEHICLES.

1,069,258.  Specification of Letters Patent.  Patented Aug. 5, 1913.

Application filed December 11, 1912. Serial No. 736,059.

*To all whom it may concern:*

Be it known that I, JOHN HORANSZKY, a subject of the King of Hungary, and resident of the city of Chicago, county of Cook, and State of Illinois, have invented certain new and useful Improvements in Propelling Means for Children's Vehicles; and I do hereby declare that the following description of my said invention, taken in connection with the accompanying sheet of drawings, forms a full, clear, and exact specification, which will enable others skilled in the art to which it appertains to make and use the same.

This invention has general reference to propelling means for children's vehicles and it consists, essentially, in the novel and peculiar combination of parts and details of construction as hereinafter first fully set forth and described and then pointed out in the claims.

In the drawings already referred to, which serve to illustrate my said invention more fully, Figure 1 is a side elevation of my improved children's vehicle, the dotted lines in said figure indicating a modified form of construction; Fig. 2 is a plan thereof; Fig. 3, a vertical cross section in line O O of Fig. 1, and Fig. 4, a modification of the propelling means.

Like parts are indicated by corresponding characters or symbols of reference in all the figures of the drawing.

My invention relates generally to means for propelling children's vehicles, which vehicles may be of the general outward contour of a horse, elephant, moose, or any other species of the animal kingdom, or in the form of an ostrich, stork, or other large fowl, in each case the propelling mechanism being the same and the only difference, the variation in shape of the outer shell of the vehicle, or, the mechanism may be applied to the ordinary boys' express carts within the natural equivalents of my invention; the only alterations being the variation in lengths of some of the parts.

In the drawings, the vehicle is represented in the shape of a galloping horse for purposes of expediency, and, A indicates the trunk, after body, and hind legs of the animal, and B, the forebody forelegs, neck and head. The forward end of part A and rear end of part B are beveled outwardly from the center as seen at C and C' Figs. 1 and 2 the apices of which are hinged together by means of hinges D and D' and E and E' and pintle F, so that the forebody B may be oscillated from side to side with respect to afterbody A in a manner easily comprehended. To the forelegs G of the forebody is fastened a transverse front axle 1, over the outer ends of which are loosely mounted wheels 2 and 2$^a$, said wheels being held in position by cross pins 3 and 3$^a$ in axle 1.

To the hind legs H—H' is fixed a rear cross axle 4 at the outer ends of which are loosely journaled wheels 5 and 5$^a$ held in place by cross pins 6 and 6$^a$.

In its simplest form, the afterbody A is made from two side members 7 and 7$^a$, preferably from wood, sawed to proper shape, and nicely painted in imitation of a galloping horse or other animal. The forward end of this afterbody is also composed of wood, in the form of members 8 and 8$^a$ properly nailed or glued to the side members 7 and 7$^a$, while the top of the body is preferably covered with leather or imitation hide 9.

Within the afterbody A is centrally pivoted a lever 10, upon a transverse pivot 10$^a$, from the forward end of which lever are depending stirrup straps 11 and 11$^a$ which straps are led to the exterior of the body A through openings 12 and 12$^a$ in the sides 7 and 7$^a$ and permitted to hang parallel to said sides. At the lower end of these straps are fixed stirrups 13 and 13$^a$, which may or may not be adjustable as to length as desired. At the rear end of the pivoted lever 10 is pivoted an upstanding post 14 extending exteriorly of the body A, and having at its upper end a more or less typical saddle 15 which fits over the back of the body A and loosely embraces the sides thereof as clearly seen in Fig. 3.

Depending from pivot pin 14$^a$, to which post 14 is also pivoted, is a depending normally, slightly, backwardly inclined rod 16 at the lower end of which rod is fastened a shoe 17. This shoe is adapted to impinge upon the ground or pavement and its lower edge is an arc with a radius struck from the center of pivot pin 14$^a$. This lower edge is roughened or serrated to form a good grip of the same upon the sidewalk for purposes hereinafter described.

At each side of the head 18 of the forebody B are located bridle or bit rings 19 and 19ª from which lead reins 20 to a point in proximity to saddle 15. These reins may also be made adjustable, and the relationship of said reins, the saddle 15, and stirrups 13 and 13ª is such that when a child is placed in the said saddle, with his or her feet engaging the stirrups, and with the hands grasping the reins, a comfortable position is naturally assumed; a position in which the child is enabled to bring into play all the body, arm, and leg muscles without undue strain upon any of them.

The operation of my device may now be described as follows, it being assumed that a child is seated in the saddle 15, with the leg stirrups 13 and 13ª and reins 20 properly adjusted. The weight of the child will depress the saddle 15 and with it the lever 10 until the saddle rests upon the afterbody. This downward travel communicated to bar 16 and shoe 17 will result in a movement of the vehicle opposite to, and, due to, the angular thrust of said shoe to the plane of travel, so that when the saddle has come in contact with said body the position of bar 16 and shoe 17 is as shown in Fig. 4. A slight pressure of the feet upon the stirrups 13 and 13ª, assisted by the spring 21 will return the saddle to its higher elevation and the rod 16 and shoe 17 to their former positions ready for the next impulse. To steer the vehicle it is simply necessary to manipulate the reins 20 in a manner easily understood.

In cases where it is desired advisable that continuous impulses be imparted to the vehicle, I construct my propelling means as shown in Fig. 4, in which 10 and 10ª are the horizontal lever and its pivot pin, respectively, while 14 is the upright standard to which the saddle 15 is affixed. Similar rod 16, shoe 17 and spring 21 is employed as before. In addition to the above, however, I pivot a like rod 16ª with a shoe 17ª to the forward end of the lever 10 adjacent to the stirrup straps 11 and 11ª, so that when rod 16 and shoe 17 are in action, rods 16ª and shoe 17ª will be upon their return journey assisted by the spring 21ª. In this construction, the child will be compelled to alternate its weight from stirrups to saddle and vice versa. This construction is particularly intended for use when the vehicle is built in imitation of an elephant or other large animal. The lever 10 may be lengthened and two saddles, either face to face or back to back, employed so that two children may enjoy the vehicle. A tiny four wheeled barouche or coupé may also be fitted with the latter described mechanism in an obvious manner.

To supply the highest class trade I resort to the art of taxidermy in the production of the body of the vehicle, using a proper internal frame work and covering the same with a skin resembling the animal to be imitated, after which the propelling means are fitted in place.

While herein I have disclosed the preferred means of carrying my invention into effect, I may make changes in details, as for instance, I may alter the steering means to meet various conditions, all of which is within the range of the skilled mechanic and is to be considered within the spirit and scope of my invention.

Having thus fully described my invention, I claim as new and desire to secure to myself by Letters Patent of the United States.

1. In a vehicle of the class described, an afterbody mounted on wheels, a forebody similarly mounted, said bodies being hinged together in a perpendicular plane to permit lateral oscillation of said forebody, a saddle reciprocatively mounted on said afterbody, means located in said afterbody, depending from said saddle, and impinging upon the ground surface, whereby reciprocation of said saddle, transmitted through said means, will impart movement to said wheeled bodies, and means controlling the alinement of said forebody.

2. In a vehicle of the class described, a wheel mounted body, means for steering the same, a lever pivoted in said body, a saddle supported by one end of said lever, stirrups depending from the opposite end thereof, means depending from said lever and impinging upon the ground surface, whereby reciprocation of said saddle transmitted through said means will impart movement to said wheeled body.

3. In a vehicle of the class described, a wheel mounted body and means for steering the same, a pivoted lever in said body, a saddle pivoted to one end of and supported by said lever, a depending arm pivoted to said lever, adjacent said saddle pivot, said arm being adapted to impinge upon the ground surface, whereby reciprocation of said saddle, transmitted through said arm, will impart movement to said wheeled body, and stirrups depending from the opposite end of said lever.

4. In a vehicle of the class described, a wheel mounted body and means for steering the same, a seat reciprocatively mounted upon said body, and means in connection with and depending below said seat, impinging upon the ground surface, whereby reciprocation of said seat transmitted through said depending means, will impart movement to said wheeled body.

5. In a vehicle of the class described, a wheel mounted body and means for steering the same, a seat reciprocatively mounted upon said body, stirrups in operative connection with said seat, whereby when said seat is ascending said stirrups are descending and means in connection with and depending below said seat, impinging upon the ground surface, whereby reciprocation of said seat, transmitted through said depending means, will impart movement to said wheeled body.

In testimony whereof, I have hereunto set my hand in the presence of two subscribing witnesses.

JOHN HORANSZKY.

Witnesses:
    EMIL J. DIRKS,
    ADOLPH STERN.